(12) United States Patent
Schulthess

(10) Patent No.: US 8,377,833 B2
(45) Date of Patent: Feb. 19, 2013

(54) LAMINATED MATERIAL, PARTICULARLY FOR AN AIRBAG, METHOD FOR THE PRODUCTION THEREOF, AIRBAG, PASSIVE RESTRAINT SYSTEMS COMPRISING AN AIRBAG, AND GAS-TIGHT POLYAMIDE POLYMER FILM

(75) Inventor: Adrian Schulthess, Tentlingen (CH)

(73) Assignee: nolax AG, Sempach Station (CH)

( * ) Notice: Subject to any disclaimer, the term of this patent is extended or adjusted under 35 U.S.C. 154(b) by 110 days.

(21) Appl. No.: 10/571,924

(22) PCT Filed: Sep. 10, 2004

(86) PCT No.: PCT/EP2004/010098
§ 371 (c)(1),
(2), (4) Date: Mar. 15, 2006

(87) PCT Pub. No.: WO2005/035323
PCT Pub. Date: Apr. 21, 2005

(65) Prior Publication Data
US 2007/0065614 A1 Mar. 22, 2007

(30) Foreign Application Priority Data
Sep. 16, 2003 (EP) ................................. 03020933

(51) Int. Cl.
B32B 27/34 (2006.01)
B32B 27/28 (2006.01)
B32B 27/12 (2006.01)
B32B 5/02 (2006.01)
B29D 22/02 (2006.01)
B60R 21/16 (2006.01)

(52) U.S. Cl. ............... 442/291; 442/59; 442/62; 442/64; 442/286; 428/36.1; 280/743.1

(58) Field of Classification Search .................. 442/164, 442/168, 232, 236, 261, 286–292
See application file for complete search history.

(56) References Cited

U.S. PATENT DOCUMENTS

| | | | |
|---|---|---|---|
| 4,361,680 A * | 11/1982 | Borg et al. | ...................... 525/420 |
| 4,725,481 A | 2/1988 | Ostapchenko | |
| 4,937,134 A | 6/1990 | Schrenk et al. | |
| 4,970,274 A | 11/1990 | Chacko et al. | |
| 5,439,227 A | 8/1995 | Egashira et al. | |
| 6,001,464 A * | 12/1999 | Schultze et al. | ............... 428/220 |
| 6,350,709 B1 * | 2/2002 | Veiga | ............................... 442/71 |
| 6,607,797 B1 * | 8/2003 | Ritter | ........................... 428/35.2 |
| 2002/0098755 A1 | 7/2002 | Veiga | |
| 2002/0122908 A1 | 9/2002 | Li et al. | |
| 2002/0145276 A1 * | 10/2002 | Veiga | ......................... 280/743.1 |
| 2003/0190429 A1 * | 10/2003 | Blackwood et al. | ........ 427/385.5 |

FOREIGN PATENT DOCUMENTS

| | | |
|---|---|---|
| EP | 0560630 | 9/1993 |
| EP | 0577493 | 1/1994 |
| EP | 1044803 | 10/2000 |
| FR | 2740384 | 4/1997 |
| JP | 6-199198 | 7/1994 |
| JP | 2003-181995 | 7/2003 |
| WO | 02/18180 | 3/2002 |
| WO | WO 02/094610 | 11/2002 |

OTHER PUBLICATIONS

Encyclopedia of Polymer Science and Technology; Bicerano, Jozef; Glass Transition, Table 1 p. 12; Online Posting Date: Jul. 14, 2006.*
POLYMERnetBASE; Polyurethane Elastomer.*
"Arnitel TPE Typcial Properties", DSM Engineering Plastics, May 2005.
http://66.102.9.104/search?q=cache:IZOzVATSpmkJ:www.td-net.co.jp/hytrel/grade/documents/grade_01.pdf+http://www.td-net.co.jp/hytrel/grade/documents/&hl=nl&ct=clnk&cd=2&gl=nl.
Sjong et al., "Accelerated Aging Study of Gamma and E-Beam Irradiated Poly(ether-block-amide) (PEBA)", ANTEC, 2006.
"Prospector" Data sheets, PEBAX 4011 and 1657, IDES, Apr. 2007.
DuPont, "Hytrel" Thermoplastic Polyester Elastomer, Product guide and properties.
"PT9400" Dureflex Aromatic Polyether Polyurethane Grades, Deerfield Urethane, BayerMaterialScience, Apr. 5, 2007.
http://www.google.nlsearch: page comprising reference to US6179008; mentioning Tm of Hytrel 5557, DuPont.
www.pebax.com, PEBAX properties, Jan. 5, 2007.
Despotopoulou et al., "The Superior Dynamic Properties of Pebax Resins", Atofina, Arkema.

* cited by examiner

Primary Examiner — Jennifer A Steele
(74) Attorney, Agent, or Firm — Shoemaker and Mattare

(57) ABSTRACT

Disclosed is a polymer film, preferably a polyamide polymer film, which comprises at least one first layer and a second layer and is laminated onto a fabric. The material of the first layer has a glass transition temperature of less than −10° C. while the material of the second layer has a glass transition temperature of less than 20° C. Preferably, the polymeric materials contain portions of polyamide blocks. The inventive fabric-polymer film laminate is suitable as a laminated material especially for an airbag.

22 Claims, No Drawings

LAMINATED MATERIAL, PARTICULARLY FOR AN AIRBAG, METHOD FOR THE PRODUCTION THEREOF, AIRBAG, PASSIVE RESTRAINT SYSTEMS COMPRISING AN AIRBAG, AND GAS-TIGHT POLYAMIDE POLYMER FILM

The invention relates to a laminated material, particularly for an airbag, to an airbag produced using this laminated material, to a passive restraint system using this airbag, to a process for production of the laminated material for an airbag, and also to a gastight polyamide polymer film.

It is standard procedure to incorporate airbags into vehicles in order to protect the occupants of the vehicle from injuries in the event of collisions. Airbags usually have a multilayer structure. There is a backing layer, e.g. a woven or knitted fabric or any other type of sheet-like structure, treated with plastics layers. The woven or knitted fabric provides the desired strength, and the plastics layer retains the gas in the airbag.

This type of laminated material for front airbags is described by way of example in EP 0 966 352 B1. A polyamide polymer film has layers composed of films whose melting point is below 220° C., and the polyamide of this polymer film has to comply with certain requirements with respect to the polymer skeleton, in particular to alkyl branching. There is a textile composed of polyamide or polyester, to which the polyamide polymer film has been bonded.

The requirements placed upon side airbags are different from those placed upon front airbags. In the event of a lateral collision, the risk of impact of the occupant on the cladding of the interior is present over a longer period, and the airbag therefore has to remain fully deployed, i.e. effective, for a period of from 20 to 40 seconds.

The requirements placed, for example, on airbags for motorcyclists are different again, these by way of example being integrated into a jacket. There are also different requirements applicable to what are known as avalanche airbags, which can be integrated into a rucksack. The intention is that the airbag remain expanded in order to prevent the avalanche victim from sinking below the snow cover. As a function of the particular use, the laminated material has to be capable of providing firstly a defined strength and secondly a predeterminable reduction in air resistance.

This is not satisfactorily possible with the known airbags. In order to achieve the required impermeability, layers composed of the materials used hitherto have to be significantly thicker. This brings disadvantages, such as increased production costs, and also shortcomings in performance. In addition, problems arise in the subsequent disposal of the laminated material, because different materials are mostly used.

It is therefore the object of the invention to eliminate the disadvantages of the prior art and in particular to provide a laminated material particularly for airbags and comparable applications which has definable ultimate tensile strength, very substantial impermeability to gas, and, if appropriate, a defined breaking point for discharge of the gas. Another object of the invention is to provide a polymer film, preferably based on polyamides, which is substantially impermeable to gas.

According to the invention, the object is achieved via a laminated material for an airbag, a production process for the laminated material for an airbag, an airbag, a passive restraint system, and also a polyamide polymer film as in the features of the independent claims.

The inventive laminated material, particularly for an airbag, encompasses a polymer film, preferably a polyamide polymer film, bonded to a backing material, where the polymer film has at least one first and one second layer. The laminated material is characterized in that the first layer is formed from a material whose glass transition temperature is below −10° C., and the second layer is formed from a material whose glass transition temperature is below 20° C. The material of the first layer preferably features a glass transition temperature below −20° C., and the material of the second layer preferably features a glass transition temperature below 10° C. The glass transition temperature of the material of the first layer is particularly preferably below −30° C., and the glass transition temperature of the material of the second layer is particularly preferably below 0° C.

The material of the first layer, which is also the adhesive layer of the polymer film, is intended to have a very low glass transition temperature Tg, because the layer has to be very soft and flexible; in particular, it must retain sufficient flexibility at −30° C. This flexibility ensures that the adhesive layer can provide sufficient bonding of the polymer film to the textile, even at low temperatures. The melting range of the adhesive layer is also lower than that of the material of the second layer, which serves as outer layer of the polymer film. This material has to comply with a number of requirements: the material has to have a high melting point; even on exposure to a temperature above 125° C., there has to be substantially no sticking of the outer layer to any other outer layer in contact therewith. Then the material of the outer layer also needs sufficient flexibility even at a temperature of −30° C. (The temperature of −30° C. is a standard temperature for testing the rigidity of an airbag material at low temperatures). At this type of low temperature, the outer layer has to remain intact, in order to be capable of maintaining the impermeability of the polymer film on deployment of the airbag.

The adhesive layer is preferably composed of lowmelting-point, soft polymers whose Tg is, specifically preferably, below minus 20° C., and is capable of good bonding to the polyamide textile used. Materials can also preferably be polyurethanes whose melting range is from 100 to 160° C. and whose Shore A hardness is below 95. (Products of this type are produced by way of example by Huntsman, Huntsman Polyurethanes, 2190 Executive Hills Boulevard, Auburn Hills, Mich. 48326, USA; Bayer Polymers, D-51368 Leverkusen, Germany or Merquinsa, Gran Vial 17, 08160 Montme16, Barcelona, Spain.)

The abovementioned sticking of the outer layer has to be avoided when the airbag has been installed but has not been deployed. Sticking also has to be avoided in the application foreseen according to the invention for sails (sailing boats, windsurfers, etc.) when these are in the compressed condition.

The material of the second layer preferably encompasses a copolyester, a copolyamide, or a polyamide elastomer. The melting point of this material is above 170° C. Materials of this type can comply with the relevant requirements, i.e. have a low coefficient of sliding friction, good low-temperature impact strength, good scrub resistance, and very good flexibility and softness.

Further preference is given to copolyester elastomer materials, copolyamide elastomer materials, or polyamide elastomer materials, in each case having a combination of polymer blocks composed of nylon-6, nylon-6,6, nylon-11, nylon-12, or a mixture of these with polymer blocks composed of polyethylene glycol, polypropylene glycol, polytetrahydrofuran, or a mixture of these. Polyamide elastomers having a combination of polymer blocks composed of nylon-6,6 with polyethylene glycol or polypropylene glycol, or having a combination of polymer blocks composed of nylon-12 with polytetrahydrofuran, have proven particularly advantageous. These polyamide elastomers are marketed inter alia by Degussa (Vestamid E series) or Atofina (PEBAX series).

One substantial advantage of the use of these polymeric materials having polyamide blocks for the laminated material is based on easier disposal, because the structure of this laminate uses classes of substance that are substantial identical or at least similar. The materials described above can be used (alone or in combination or in a mixture with other plastics).

Additional layers in the structure of the composite are also conceivable.

The copolyester, the copolyamide, or the polyamide elastomer can, if appropriate, comprise additives, such as antioxidants, lubricants (e.g. fatty acid amides) or antiblocking agents (e.g. silica), where these improve the properties of these materials, e.g. stability or process ability.

In another, advantageous embodiment of the laminated material for an airbag, the material of the first and/or of the second layer comprises at least one flame retardant. These flame retardants can be based on halogen-containing or on halogen-free components. The halogen-containing flame-retardant masterbatches comprise, for example, decabromocyclohexane, octabromodiphenyl ether, etc, or antimony trioxide (Sb205) in a carrier polymer, which is mostly LDPE. It is also possible to use halogen-free flame retardants, e.g. phosphate esters, aluminum oxide trihydrate, magnesium oxide dihydrate, red phosphorus, zinc borate, ammonium polyphosphate, melamine cyanurate, zinc stannate, or zinc hydroxide stannate.

Addition of a flame retardant increases the resistance of the polymer film of the laminated material for an airbag with respect to thermal stress via the hot combustion gases which are liberated during triggering of the airbag. This avoids melting of the entire polymer film or its ignition and resultant malfunction of the airbag.

Coloring of at least one of the layers of the polymer film is another possibility. This permits the adhesive layer to be distinguished easily from the outer layer.

The laminated material, in particular for an airbag, advantageously has a backing layer which may have been produced, e.g. woven, from polyamide filaments or poly-amide yarn or polyester filaments or polyester yarn. The backing layer can also have the form of a nonwoven or knitted fabric or net (gauze). Backing material and film layer must have been bonded. This can especially be achieved via adhesive bonding or via a laminating procedure. In this process, by way of example, at the softening point, one of the layers, or the backing material, can be bonded, via pressing or on a laminating plant, to the other layer(s). The bonding or laminating of backing material and film layer can take place sequentially or in one operation. It is significant that the laminated material has a layer for reinforcement and establishing the strength of the airbag and for providing the impermeability to gas. Of course, the backing layer also contributes to some extent to the strength, and the backing layer can affect impermeability to gas. The backing layer can also have been pretreated or precoated.

Another aspect of the invention is a process for production of the inventive laminated material. The process comprises the steps of provision of a polymer film which encompasses at least two layers, and of lamination of the polymer film onto a backing layer, preferably a woven or knitted fabric, preferably a polyamide structure. The polymer film and, respectively, the materials of the first and of the second layer have properties identical with those stated above for the laminated material.

The polymer film and, respectively, its first and second layer can be produced via extrusion. One suitable extrusion process is blown-film extrusion, but other types of extrusion which are used for production of foils, especially coextrusion, also have very good suitability here. However, it is important that these types of extrusion can produce foils or films of the desired thicknesses. The preferred extrusion process is blown-film coextrusion or flat-film coextrusion. These extrusion processes are known to the person skilled in the art.

If, in one embodiment of the process, the first and second layer are produced via separate extrusion, the lamination of these layers to give a polymer film takes place in a further step. This additional step also permits use of polymer films which are composed of different materials for production of the laminated material for an airbag.

Another aspect of the invention is an airbag which has been produced from an inventive laminated material. For this airbag, appropriate cut-to-size sections are produced from the laminated material, and these are joined to give the airbag.

Another aspect of the invention is a passive restraint system which encompasses at least one inventive airbag.

The invention also provides a polyamide polymer film which comprises at least two layers. This polyamide polymer film is characterized in that the glass transition temperature of the first layer is below −10° C., and the glass transition temperature of the second layer is below 20° C., and in that the second layer encompasses at least one copolyester, one copolyamide, or one polyamide elastomer, where the melting point of the polyamide elastomer is above 170° C. The glass transition temperature of the material of the first layer is preferably below −20° C., more preferably below −30° C., and the glass transition temperature of the material of the second layer is preferably below 10° C., particularly preferably below 0° C.

The polyamide polymer film advantageously has properties and constituents identical with those described above in the explanation of the laminated material for an airbag.

The inventive polyamide polymer film is very substantially impermeable to gas and can therefore preferably be used as a coating impermeable to gas of a textile. The use for production of airbags or else of sails provides a wide variety of surprising advantages and provides great design freedom.

The invention is described in more detail below, using examples.

INVENTIVE EXAMPLES 1-3

Blown-film extrusion is used to produce films composed of Vestamid E40 S3 (Example 1), Vestamid E62 S3 (Ex. 2), and Vestamid EX 9200 (Ex. 3) (producer: Degussa) with weights per unit area of 20, 35, and 45 g/m$^2$. The same raw materials were also used to produce flame-retardant films via addition of 0% (1-0, 2-0, 3-0) 5% (1-5, 2-5, 3-5), 10% (1-10, 2-10, 3-10) or 20% (1-20, 2-20, 3-20) of a commercially available, flame-retardant (Luvogard PE 81, Lehmann & Voss) incorporated into polyethylene (the terms giving first the example reference and secondly the content of flame retardant). The blown-film extruder used is a Collins system (25×30D), equipped with a commercially available 5-zone screw suitable for extrusion of a very wide variety of polymers, with an appropriate blown-film take-off (180/400).

The conditions stated in Table 1 were used for extrusion of the films.

TABLE 1

Extrusion conditions for Inventive Examples 1-3

| Raw material | Feed in °C. | Heating zone 1-5 rising in °C. | Head temperature in °C. | Comments |
|---|---|---|---|---|
| 1-0, 1-5, 1-10, or 1-20 | 155 | 170-200 | 200 | All of the films are very soft, have no fish-eyes, and have very good mechanical properties |
| 2-0, 2-5, 2-10, or 2-20 | 155 | 170-200 | 200 | As for Ex. 1 |
| 3-0, 3-5, 3-10, or 3-20 | 170 | 190-230 | 230 | As for Ex. 1 |

The individual films were laminated together in a Meyer twin-belt flat lamination system (KFK-S 400 700) to give 2-layer films.

Flat-belt lamination system: 2 continuous belts conduct the product through the system. One belt circulates around the upper part of the lamination system and the other belt circulates around the lower part. The two belts are driven by the same motor, and the belts therefore always run synchronously.

The speed of the belts is capable of stepless change. The distance between the upper and lower part of the system (height) can be altered as appropriate for the thickness of the product. Many products require pressure after heating. Two pressure rolls exert a preselected force on the product. The downward movement of the upper pressure roll is restricted via an adjustable stop. This stop is called a level. The pressure roller therefore exerts the preselected force on the product, but only to the extent permitted by the level stop. After passage through the pressure rolls, the laminate is conducted by the belts through the cooling section and can be wound up at the end of the system.

The adhesive layer or lower-melting-point layer used was a film whose weight per unit area was 35 or 45 g/m², composed of Vestamid E40 S3 with 0% (1-0), 5% (1-5), or 10% (1-10) of the flame retardant-PE mixture. The outer layer, or high-melting-point layer, used was a film composed of 18 g/m² of Vestamid E 62S or 20 g/m² of Vestamid EX 9200 with 0% (2-0, 3-0), 10% (2-10, 3-10), or 20% (2-20, 3-20) of the same flame retardant-PE mixture.

The following conditions were used to laminate the films described to give the 2-layer films:
Laminating temperature 170° C.
Layer thickness 0.1 mm
Level (height adjustment of 0 mm upper pressure roll)
Pressure exerted 1 N
Lamination speed 6 m/min In another production procedure, a 2-layer film composed of 20 g/m² of Vestamid EX 9200 with 10% of the flame retardant-PE mixture (3-10) and Vestamid E 40 S3 with 5% of the flame retardant-PE mixture (1-5) was produced on the type of 3-layer blown-film-coextrusion plant that is prior art nowadays and is produced and marketed by companies such as Reifenhauser, Alpine, or Windm011er-Holscher. The layer thickness distribution was 22.5 g/m² of component 1-5 (extruder 1), 22.5 g/m² of component 1-5 (extruder 2), and 20 g/m² of component 3-10 (extruder 3).

The resultant 2-layer films, or the coextruded 2-layer film, is/are laminated on the Meyer twin-belt lamination system to a polyamide textile composed of high-strength yarn (OPW, Berger Safety Textiles). As mentioned, these laminated materials are preferably used as airbag textile sealing systems.

The process conditions for lamination of the film layers to the textile would be as follows:
Laminating temperature 170° C.
Layer thickness 0.1 mm
Level (height adjustment of 0.5 mm upper pressure roll)
Pressure exerted 18 N
Lamination speed 1 m/min

INVENTIVE EXAMPLES 4 TO 19 AND COMPARATIVE EXAMPLES 1 TO 2

The 2-layer-film airbag textile laminates described above were tested with regard to peelability of the outer layer from another outer layer in intimate contact with the first. For this, the outer layer of a test specimen of dimensions 10×10 cm was placed on the outer layer of another test specimen likewise of dimensions 10×10 cm. This stack was loaded with a weight of 10 kg and exposed to 125° C. for 14 days in a hot-air oven. The various pieces of textile were removed from the oven after that period and stored for 1 h at room temperature. After cooling, the separation performance of the textile pieces was determined via measurements. The results are shown in Table 2. The adhesive layer and outer layer data are based on the compounds stated in the Inventive Examples 1-3, inclusive of the respective added amounts of flame retardant-PE mixture, and also the weight per unit area of the films, and therefore by way of example 1-0/35 indicates a film composed of Vestamid E40 S3 without addition of flame retardant, with a weight per unit area of 35 g/m².

The comparative examples are representative examples of various materials combinations of extrudable, thermoplastic polyesters, polyether polyurethanes, or polyester polyurethanes. PU1 here is thermoplastic polyester polyurethane whose melting range is 110-130° C. and whose Shore A hardness is 85. By way of example, these products are produced and marketed by Huntsman, Huntsman Polyurethanes, 2190 Executive Hills Boulevard, Auburn Hills, Mich. 48326, USA; Bayer Polymers, D-51368 Leverkusen, Germany or Merquinsa, Gran Vial 17, 08160 Montme16, Barcelona, Spain.

PU2 is a high-melting-point polyester polyurethane whose melting range is 160-170° C. and whose Shore A hardness is 85-90. These products are produced and marketed by Bayer Polymers, D-51368 Leverkusen, Germany or Merquinsa, Gran Vial 17, 08160 Montme16, Barcelona, Spain. PES is a high-melting-point polyester whose melting range is 210-220° C. and whose Shore A hardness is Shore D 57. These products are produced and marketed inter alia by DSM, DSM Engineering Plastics, Poststraat 1, N-6130 AA Sittard, or Eastman, Eastman Chemical Company, 100 North Eastman Road, P.O. Box 511, Kingsport, Tenn. 37662-5075.

TABLE 2

Separation tests for Inventive Examples 4-19 and for Comparative Examples 1 and 2.

| Example | Adhesive layer | Outer layer | Separation performance* |
|---|---|---|---|
| 4 | 1-0/35 | 2-5/18 | 1 |
| 5 | 1-0/35 | 2-10/18 | 1 |
| 6 | 1-0/35 | 2-20/18 | 1 |
| 7 | 1-5/45 | 2-5/18 | 1 |
| 8 | 1-5/45 | 2-10/18 | 1 |
| 9 | 1-5/45 | 2-20/18 | 1 |
| 10 | 1-10/45 | 2-5/18 | 1 |
| 11 | 1-10/45 | 2-10/18 | 1 |
| 12 | 1-10/45 | 2-20/18 | 1 |

TABLE 2-continued

Separation tests for Inventive Examples 4-19
and for Comparative Examples 1 and 2.

| Example | Adhesive layer | Outer layer | Separation performance* |
|---|---|---|---|
| 13 | 1-0/35 | 3-0/20 | 1 |
| 14 | 1-0/35 | 3-10/20 | 1 |
| 15 | 1-5/45 | 3-0/20 | 1 |
| 16 | 1-5/45 | 3-10/20 | 1 |
| 17 | 1-10/45 | 3-0/20 | 1 |
| 18 | 1-10/45 | 3-10/20 | 1 |
| 19 | 1-5/45** | 3-10/20** | 1 |
| C1 | PU1/45 | PES/20 | 3 |
| C2 | PU1/45 | PU2/20 | 4 |

*1 = The two layers are separable without exerting any force, 2 = The two layers can easily be separated, 3 = The two layers can still be separated, 4 = The two layers cannot be separated without damaging the surface (break-out of adhesive).
**Coextruded film In another series of experiments, the adhesion of the adhesive layer to the textile and, respectively, to the outer layer was checked. For this, laminates were produced with the following layer sequence:

PA textile—adhesive layer—outer layer—adhesive layer—outer layer—adhesive layer—PA textile. The dimensions of these laminates were 5×20 cm.

For the lamination process, two prefabricated textile2-layer-film composites were laminated to one another, using an adhesive layer on the following constitution: Vestamid E40 S3 with 45% of the flame retardant-PE mixture (1-45). The conditions applicable were in other respects identical with those for production of the texile-2-layer-film composite as described above.

6 corresponding laminates were produced from each combination. After production, each pair of laminates was clamped into a tensile testing machine (1120.25 from Zwick, August-Nagel-Strasse 11 D-89079 Ulm, Germany), and the peel resistance was measured on storage at room temperature. A peel resistance >0.6 N/mm is generally assessed as good. Two of the laminates were exposed to boiling water for one hour. After drying at room temperature for 6 hours, peel resistance was again measured. The peel value should not be less than 70% of the initial value. The boiling test here is intended to simulate the hot, humid conditions occurring in an automobile. The test values reported in Table 3 show that slightly better results are achieved with the relatively thick 45 g/m² adhesive film.

A coefficient of sliding friction is determined to DIN 53375. A very low coefficient means that the surfaces have good slip over one another, and this is especially important during opening of the airbag, because otherwise difficulties can arise, such as non-uniform deployment. A coefficient <0.6 is assessed as sufficient. For the same reason, the storage test described above and relating to the surfaces, i.e. to the outer layers in contact with one another at 125° C., was carried out.

A further test carried out was a horizontal flame test based on UL 94HB standard. The center of a horizontally clamped strip was exposed to, and ignited by, a Bunsen burner flame for a period of 20 seconds. The test assessed whether complete combustion extended to the end of the strip. If complete combustion does not occur, the strip is classified as satisfactory. Polyamide elastomers have intrinsically low flammability. In contrast, there was complete combustion of the strips with PU outer layer and polyester outer layer. Very good flame retardancy is achieved via addition of 10% of a flame retardant-PE mixture in the outer layer and of 5% of the mixture in the adhesive layer. Table 3 collates the results of the tests described.

TABLE 3

Properties of various combinations of adhesive layer and outer layer.

| Example | Peel Resistance on RT storage (required value > 1 N/mm) | Peel Resistance after boiling test 100° C./1 h in N/mm | Coefficient of friction (sliding) Required value 9.25 μ | Self-extinguishing in % of fire tests |
|---|---|---|---|---|
| 4 | 0.91 | 0.73 | 0.38 | 50 |
| 5 | 0.79 | 0.50 | 0.44 | 25 |
| 6 | 0.92 | 0.59 | 0.41 | 40 |
| 7 | 0.70 | 0.66 | 0.47 | 100 |
| 8 | 0.94 | 0.74 | 0.38 | 84 |
| 9 | 1.02 | 0.96 | 0.46 | 100 |
| 10 | 0.68 | 0.64 | 0.38 | 100 |
| 11 | 0.62 | 0.54 | 0.46 | 100 |
| 12 | 0.68 | 0.52 | 0.40 | 100 |
| 13 | 0.64 | 0.44 | 0.42 | 100 |
| 14 | 0.78 | 0.46 | 0.44 | 100 |
| 15 | 0.75 | 0.7 | | 100 |
| 16 | 0.79 | 0.72 | | 100 |
| 17 | 0.63 | 0.48 | | 100 |
| 18 | 0.73 | 0.57 | | 100 |
| 19 | 0.8 | 0.73 | 0.4 | 100 |
| C1 | | | 0.6 | 0 |
| C2 | | | 0.8 | 0 |

What is claimed is:

1. A laminated material, particularly for an airbag, said laminated material comprising
a textile backing layer and
a polymer film bound to said backing layer, wherein the polymer film comprises at least one first and one second layer, wherein
the first layer is formed from a first polymeric material whose glass transition temperature is below −10° C., and
the second layer is formed from a second polymeric material different from the first material whose glass transition temperature is below 20° C. and
the first material has a melting point which is less than a melting point of said second material, wherein
the second layer is of a material selected from the group consisting of copolyamide, polyamide elastomer, and mixtures thereof,
the melting point of the second material is above 170° C. and
the polymer film is produced via a foil or film-extrusion process.

2. The laminated material particularly for an airbag as claimed in claim 1, wherein said polymer film is a polyamide film.

3. The laminated material particularly for an airbag as claimed in claim 1, wherein said textile backing layer is a nonwoven, woven or knitted fabric.

4. The laminated material particularly for an airbag, as claimed in claim 1, wherein the glass transition temperature of the material of the first layer is below −20° C. and the glass transition temperature of the material of the second layer is below 10° C.

5. The laminated material particularly for an airbag as claimed in claim 4, wherein the glass transition temperature of the material of the first layer is below −30° C.

6. The laminated material particularly for an airbag as claimed in claim 4, wherein the glass transition temperature of the material of the second layer is below 0° C.

7. The laminated material particularly for an airbag, as claimed in claim 3, wherein the material of the second layer comprises a combination of polymer blocks selected from the group consisting of nylon-6, nylon-6,6, nylon-11, nylon-12, and mixtures thereof with polymer blocks selected from the group consisting of polyethylene glycol, polypropylene glycol, polytetrahydrofuran, and mixtures thereof.

8. The laminated material particularly for an airbag, as claimed in claim 1, wherein the material of the second layer comprises a polyamide elastomer selected from a combination of polymer blocks composed of nylon-6,6 and either polyethylene glycol or polypropylene glycol, or from a combination of polymer blocks composed of nylon-12 and polytetrahydrofuran.

9. The laminated material particularly for an airbag, as claimed in claim 1, wherein the material of the first and/or of the second layer comprises at least one flame retardant.

10. The laminated material, particularly for an airbag, as claimed in claim 9, wherein the flame retardant is selected from the group consisting of halogen- containing flame retardants, phosphate esters, aluminum oxide trihydrate, magnesium oxide dihydrate, red phosphorus, zinc borate, ammonium polyphosphate, melamine cyanurate, zinc stannate, zinc hydroxide stannate, and combinations thereof.

11. The laminated material particularly for an airbag, as claimed in claim 1, wherein the backing layer comprises polyamide filaments or polyester filaments or polyamide yarn or polyester yarn.

12. An airbag, comprising a laminated material as claimed in claim 1.

13. A passive restraint system, encompassing at least one airbag as claimed in claim 12.

14. A polyamide polymer film comprising at least two layers,
a first layer made of a first material and
a second layer made of a second material different from said first material, wherein
the glass transition temperature of the first layer is below −10° C. and the glass transition temperature of the second layer is below 20° C., and
the second layer is of a material selected from the group consisting of copolyamide, polyamide elastomer, and mixtures thereof,
the first material having a melting point which is less than a melting point of said second material,
the melting point of the second material being above 170° C. and
the polymer film is produced via a foil or film-extrusion process.

15. The polyamide polymer film as claimed in claim 14, wherein the glass transition temperature of the material of the first layer is below −20° C. and the glass transition temperature of the material of the second layer is below 10° C.

16. The laminated material particularly for an airbag as claimed in claim 15, wherein the glass transition temperature of the material of the first layer is below −30° C.

17. The laminated material particularly for an airbag as claimed in claim 15, wherein the glass transition temperature of the material of the second layer is below 0° C.

18. The polyamide polymer film as claimed in claim 15, wherein the second layer material comprises a combination of polymer blocks selected from the group consisting of nylon-6, nylon-6,6, nylon-11, nylon-12, and mixtures thereof with polymer blocks selected from the group consisting of polyethylene glycol, polypropylene glycol, polytetrahydrofuran, and mixtures thereof.

19. The polyamide polymer film as claimed in claim 15, wherein the material of one layer, preferably of the second layer, is a polyamide elastomer is a combination of polymer blocks composed of nylon-6,6 with polyethylene glycol or polypropylene glycol, or a combination of polymer blocks composed of nylon-12 with polytetrahydrofuran.

20. The polyamide polymer film as claimed in claim 15, wherein the material of the first and/or second layer comprises at least one flame retardant selected from the group consisting of halogen-containing flame retardants, phosphate esters, aluminum oxide trihydrate, magnesium oxide dihydrate, red phosphorus, zinc borate, ammonium polyphosphate, melamine cyanurate, zinc stannate, zinc hydroxide stannate, and mixtures thereof.

21. The laminated material as claimed in claim 1, wherein the second layer serves as an outer layer of the polymer film 22. The airbag as claimed in claim 12, wherein the second layer of the polymer film of the laminated material serves as an outer layer of the polymer film.

* * * * *